United States Patent Office 3,372,151
Patented Mar. 5, 1968

3,372,151
PROCESS FOR POLYMERIZATION USING SALTS OF ALKYL TRISULFONYLMETHANES (TSM'S) AS EMULSIFIERS
Clyde Stephen Scanley, Stamford, Conn., assignor to American Cyanamid Company, Stamford, Conn., a corporation of Maine
No Drawing. Continuation-in-part of application Ser. No. 324,259, Nov. 18, 1963. This application Dec. 21, 1964, Ser. No. 420,134
5 Claims. (Cl. 260—86.1)

ABSTRACT OF THE DISCLOSURE

A suspension or emulsion polymerization process in which the emulsifying agent is a substituted trisulfonylmethane of the formula:

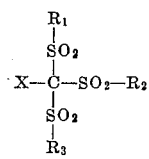

wherein X is a cation, $R_1$ is the functional group $-C_nH_{2n}-Z-C_mH_{2m+1}$ with Z being methylene, phenylene, naphthylene, cyclohexylene, or oxy, provided that $n+m$ is from 4 to 21, further provided that when Z is oxy, $n$ is at least 1, and $R_2$ and $R_3$ each are lower alkyl, phenyl, tolyl, cyclohexyl or $R_1$.

---

This application is a continuation-in-part of application Ser. No. 324,259, filed Nov. 18, 1963, and now abandoned.

This invention relates to the production of polymers and more particularly to a new and improved method of polymerizing unsaturated organic compounds. Even more particularly, this invention relates to a novel process for polymerizing ethylenically unsaturated organic compounds in an aqueous medium.

Numerous methods are well known for accomplishing the polymerization of unsaturated organic compounds. However, control of polymerization is frequently difficult because it is often accompanied by considerable development of heat. Since temperature affects the rate or degree of polymerization, efforts have been made to regulate the polymerization in order to obtain a fully polymerized product in suitable form. Emulsion and suspension polymerization, particularly in an aqueous medium, have the advantage of permitting a more effective regulation of polymerization since the heat evolved during the polymerization reaction or applied to the reaction medium may be more advantageously dissipated or distributed.

In carrying out an emulsion or suspension polymerization process, a polymerizable monomer or a mixture of polymerizable monomers is combined with a mixture of water, emulsifying agent, dispersing agent, polymerization catalyst, stabilizer, plasticizer, chain stopping agent, etc., all of which are maintained in the desired ratio, and the resulting mixture subjected to elevated temperature to complete polymerization. The polymer formed in the aqueous emulsion as a latex may be used as such or it may be separated from the reaction mixture or medium by any suitable means such as coagulation with any suitable solvent, freezing, and the like. The polymer formed in aqueous suspension may be separated by filtration, centrifugation, and the like. In addition to the emulsifying agent serving the function of forming a stable latex or acting to suspend the polymer, the emulsifying agent should not detract from the properties of the resulting polymer. Since the emulsifying agent is retained in the polymer latex and, in certain instances, in the coagulated or separated polymer, the importance of the emulsifying agent forming a stable latex and of not interfering with the heat and light stability and water sensitivity of the polymer recovered and of a film made from such a latex becomes apparent.

Numerous emulsifying agents for use in emulsion and suspension polymerization are well known. However, many of such emulsifying agents are not effective for the production of stable polymer emulsions containing therein little or no coagulum. Moreover, polymers prepared by emulsion and suspension polymerization techniques using certain other emulsifying agents do not possess desired physical properties such as, for example, heat and mechanical stability and clarity. In addition, films prepared from polymer emulsions employing many other emulsifying agents for the preparation thereof display a marked sensitivity toward water.

I have now discovered novel emulsifying agents eminently suitable for use in emulsion and suspension polymerization of ethylenically unsaturated organic compounds. Said emulsifying agents are defined as substituted trisulfonylmethane salts which may be depicted as

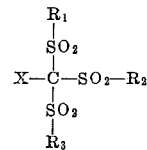

wherein X represents a cation selected from the group consisting of alkali metal, amino and ammonium cations; $R_1$ represents the functional group $$-C_nH_{2n}-Z-C_mH_{2m+1}$$

with Z equal to a radical selected from the group consisting of methylene ($-CH_2-$), oxy ($-O-$),

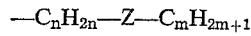
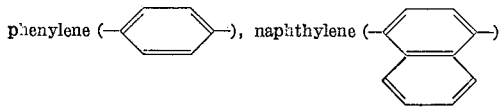

and

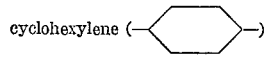

with the provision that $n+m$ be a whole integer from 4 to 21; $R_2$ and $R_3$ each represent a substituent selected from the group consisting of lower alkyl, phenyl, tolyl and cyclohexyl or, in some cases, the functional group defined for $R_1$ above. A compound where such substitution occurs would thus have all three of $R_1$, $R_2$, and $R_3$ representing the functional group

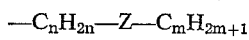

In a compound wherein one or all of the R's are alkyl in accord with the formula $-C_nH_{2n}-Z-C_mH_{2m+1}$ where Z is methylene, the alkyl groups involved may be either normal or branched chain structures and would embrace such members as pentyl, hexyl, heptyl, octyl, nonyl, decyl, undecyl, dodecyl, tridecyl, pentadecyl, hexadecyl, octadecyl, and the like. Where alkyl group substitution is involved it should be understood that the substitution may be of similar alkyl groups, e.g., where $R_1$, $R_2$, and $R_3$ each represent a dodecyl group, or mixed, e.g., where $R_1$ represents a hexyl group, $R_2$ represents an octyl group and $R_3$ represents a dodecyl group (including normal and branched chain structures).

The substituted trisulfonylmethane salts which are employed in the process of this invention are further described and claimed in my copending application Ser. No. 607,587, filed Dec. 9, 1966. The latter application is a continuation-in-part of Ser. Nos. 420,097, 324,184, and 172,818, filed Dec. 21, 1964, Nov. 18, 1963, and Feb. 12, 1962, respectively. The latter three parent cases have been abandoned. The subject matter of these applications is incorporated herein by reference.

The substituted trisulfonylmethane salts which are employed in the process of this invention can, in general, be readily prepared by the general reaction:

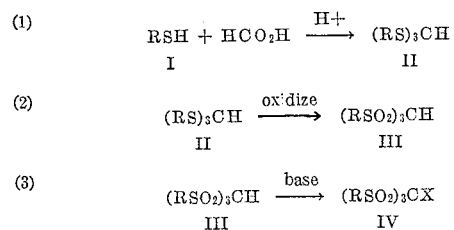

In the above reaction a suitable substituted mercaptan (I) wherein R has any of the values specified for $R_1$, $R_2$, or $R_3$ as defined above is reacted with formic acid as illustrated or a lower alkyl ester thereof to form the corresponding substituted trithioorthoformate (II). The reaction is conducted in the presence of anhydrous HCl.

The substituted trithioorthoformate (II) dissolved in a suitable inert solvent, such as chloroform, is treated with a 100 percent excess of peracetic acid at a temperature of $-20$ to $-30°$ C. with constant agitation of the reaction mixture while the peractic acid is being added. After a period of from about one-half hour to one hour, the reaction mixture is allowed to warm to room temperature and stand overnight. The product (III) is recovered in a pure state by conventional techniques, such as by treating with additional solvent and extracting with water. The solvent is evaporated off and the product recrystallized from a suitable solvent such as, for example, ethyl alcohol.

Step (3) of the process of preparation is a salt formation step wherein a molecular equivalent quantity of a suitable basic compound is added to an aqueous slurry or organic solvent dispersion of the substituted trisulfonylmethane so as to obtain the salt (IV).

A wide variety of basic compounds are suitable for preparation of such salts. The only limitation on choice of basic reactants is that such compounds render the substituted trisulfonylmethane compounds substantially water soluble. It will be apparent to those skilled in the art of emulsion or suspension polymerization of ethylenically unsaturated organic compounds that at least three classes of basic compounds will render the substituted trisulfonylmethane compounds substantially water soluble. These are alkali metal hydroxides, ammonium hydroxide and amines.

Among the alkali metal hydroxides may be mentioned sodium and potassium hydroxide. The amines include alkyl amines such as methylamine, ethylamine, dimethylamine, trimethylamine, triethylamine, triisopropylamine, triisobutylamine, cyclohexylamine and the like; hydroxy amines such as monoethanolamine, diethanolamine, triethanolamine, monoisopropanolamine, diisopropanolamine, triisopropanolamine, and the like; heterocyclic amines such as morpholine, pyridine, piperidine, and the like; aromatic amines such as aniline, and the like; and quaternary ammonium hydroxides such as tetramethylammonium hydroxide, tetraethylammonium hydroxide, trimethylhydroxyethylammonium hydroxide, tetrahydroxyethylammonium hydroxide, benzyltrimethylammonium hydroxide and the like.

The term "amino" in the definition of the cation X is used herein to mean the cation formed from any of the foregoing amines. The precise chemical structure of the cation will, of course, depend on the character of the basic reactant chosen to form a salt by neutralization with a substituted trisulfonylmethane depicted as (III) above. For example, when a primary, secondary or tertiary amine is the base, "amino" more particularly means an alkyl ammonium cation; when a quaternary ammonium hydroxide is the reactant, "amino" defines a quaternary ammonium cation. When a hydroxy amine is the base, "amino" is a hydroxy quaternary ammonium cation or a hydroxy alkyl ammonium cation.

The monomers to be polymerized or copolymerized by the process of this invention comprise the substantially water-insoluble ethylenically unsaturated organic compounds. The expression "substantially water-insoluble" as used herein in relation to the monomer to be polymerized refers to those monomers which have at least some solubility in water so that some of the monomer may enter the aqueous medium but still have comparatively little solubility in water that they are regarded as being relatively water-insoluble. Preferably, the monomers have a solubility in water at room temperature of from 0.1 part to 30 parts per 100 parts of water, although for some preparations monomers of greater water solubility may be employed, e.g., methacrylic acid and acrylic acid. Particularly preferred monomers are those having a solubility of from 0.1 part to 15 parts per 100 parts by weight of water.

The expression "ethylenically unsaturated," as used herein, refers to those monomers possessing one or more polymerizable ethylenic groups in their molecule. Examples of such monomers include maleic acid esters, dimethylbutadiene-1,3, butadiene-1,3, isoprene, chloroprene, styrene, alpha-methyl styrene, dichlorostyrene; esters of unsaturated acids such as methyl acrylate, propyl acrylate, butyl acrylate, hexyl acrylate, octyl acrylate, methyl methacrylate, and butyl methacrylate; vinylidene halides such as vinylidene chloride and vinylidene bromide; vinyl halides such as vinyl chloride and vinyl bromide; unsaturated nitriles such as methacrylonitrile and acrylonitrile and the corresponding unsaturated acids such as methacrylic acid and acrylic acid; vinyl esters of monocarboxylic acids such as vinyl acetate, vinyl caproate, vinyl chloroacetate, vinyl benzoate, and vinyl valerate; vinyl esters of polycarboxylic acids such as divinyl succinate, divinyl adipate, vinyl allyl phthalate, and diallyl phthalate; vinyl esters of the unsaturated acids such as vinyl acrylate, vinyl crotonate, and vinyl methacrylate; vinyl ethers such as vinyl ethyl ether, vinyl butyl ether; and vinyl ketones such as vinyl hexyl ketone and vinyl octyl ketone.

Preferred monomers to be polymerized or copolymerized by the process of this invention comprises the vinylidene monomers containing a polymerizable $$CH_2=C=$$

group and no other polymerizable group, such as styrene, alpha-methyl styrene, butadiene, vinyl chloride, vinylidene chloride, vinyl acetate, vinyl butyrate, acrylonitrile, ethyl acrylate and the lower alkyl esters thereof including methyl acrylate, butyl acrylate, 2-ethylhexyl acrylate, methyl methacrylate, ethyl methacrylate, and the like.

Any of the foregoing monomers may be polymerized by the process of this invention singly or in admixture with one or more of other of such monomers. In the former case homopolymerization results whereas in the latter process copolymerization is the consequence. "Copolymerization" is here meant to include not only polymerization of two different such monomers but also to include polymerization of three different such monomers (sometimes called "terpolymerization") or even four or more different such monomers. Likewise, the proportion of different monomers is not important, the invention being the improved polymerizability effected by the substituted trisulfonylmethane salts rather than the exact chemical constitution of the resulting polymer.

Where emulsions are employed for the polymerization, water soluble free radical polymerization catalysts such as peracetic acid and persalts such as potassium persulfate, potassium perborate and the like will be employed. In the case of suspensions of the monomers to be polymerized, monomer-soluble catalysts such as benzoyl peroxide, lauryl peroxide and the like will be utilized. In each case water is present in the reaction medium. Of the two systems, emulsion polymerization (water-soluble catalyst) is preferred. Obviously, any other of the well known free radical catalysts for either suspension or emulsion polymerization may also be employed.

The amount of the above-described catalysts to be used will vary over a wide range depending upon their type and desired rate of polymerization. In most instances, the amount of catalyst will vary from 0.01% to 5%, and more preferably, from 0.1% to 1%, wherein the percentages are by weight based on the aqueous phase.

A broad range of temperature is suitable for conducting the polymerization but in general temperatures of about 0° C. to 90° C. are used, and very good results are obtained with the aqueous medium at about 15° C. to 70° C.

The method of recovering the polymer will vary depending on the type of medium used. If the polymer is formed as a stable emulsion, the polymer particles may be recovered by any coagulating means such as freezing or addition of coagulating agents.

Uniformly reproducible latices having excellent mechanical and heat stability may be obtained using the emulsifying agents of this invention regardless of the particular minor modifications in emulsion polymerization techniques which may be resorted to.

The amount of emulsifying agent used may vary over a wide range. Best results are obtained when an amount of trisulfonylmethane salt is present to afford a substantially stable emulsion or suspension of polymer. In general, concentrations of the emulsifying agent fall within the range of about 0.05 to about 10% by weight based upon the monomer or monomers.

In order that the present invention may be more completely understood, the following examples are given in which all parts are parts by weight unless otherwise specified. These examples are set forth primarily for the purpose of illustration and any specific enumeration of detail contained therein should not be interpreted as a limitation on the case except where indicated in the appended claims.

*Preparation of tris-[n-heptylsulfonyl]methane and sodium salt*

A solution of 0.256 mol (18.95 grams) of ethyl formate and 0.828 mol (109.3 grams) n-heptyl mercaptan is saturated with anhydrous HCl at 0° C. The solution is re-saturated twice more over a two-day period. The organic layer is separated and washed with water, sodium carbonate solution and water again and dried over calcium chloride. Excess n-heptyl mercaptan is distilled from the hexyl trithioorthoformate formed down to a pressure of 0.25 mm. of mercury at 170° C.

The final yield of product is 97 percent based on ethyl formate or 101.0 grams of heptyl trithioorthoformate which exhibits a slight yellow coloring.

Heptyl trithioorthoformate, 0.248 mol (101.0 grams), from above is dissolved in 300 ml. of chloroform and the solution stirred at −20 to −30° C. A 100 percent excess of peracetic acid (440 grams of 50 percent acid solution) is added steadily to the chloroform solution over a 25 minute period with vigorous stirring while the temperature is controlled at −20 to −30° C. by means of an acetone-Dry Ice bath. The reaction mixture is then allowed to warm to room temperature with stirring and is held at this temperature for 2–3 hours after which the mixture is allowed to stand overnight.

Additional chloroform is added to the mixture which is then extracted six times with an equal volume of water. The first water extract is back extracted with chlorofrom and this extract is then combined with the main chloroform layer. The remainder of the chloroform is boiled off and the product is crystallized from ethanol, filtered and washed with ethanol. A first crystalline crop of 70.5 grams of tris-[n-heptylsulfonyl]methane is obtained having an M.P. of 168.5–171.0° C. and constituting a 57 percent yield.

The compound thus obtained exhibits strong infra-red bands at 1160, 1320, and 1340 cm.$^{-1}$ and a medium strength band at 1130 cm.$^{-1}$ and weaker bands at 780, 1110, 1510 cm.$^{-1}$.

This compound is then dissolved in aqueous acetone and treated with an equivalent amount of aqueous sodium hydroxide. The salt is recovered by drying.

*Preparation of amino salt of tris-(n-heptylsulfonyl) methane*

A solution of 0.10 mol (50.3 grams) of tris-(n-heptylsulfonyl)methane (prepared as above) in 500 ml. of chloroform is neutralized by adding to it, slowly with stirring, 0.10 mol (10.1 grams) of triethylamine. The solution is chilled to −10° C. and the crystalline triethyl ammonium salt is recovered by filtration.

Other salts of the substituted trisulfonylmethane compounds may be prepared substantially in accordance with the two illustrative preparations above.

EXAMPLES 1–3

*Preparation of copolymer of methyl methacrylate/ethyl acrylate; copolymer of styrene/ethyl acrylate; and homopolymer of vinyl acetate*

TABLE I

| Ingredients [1] | Ex. 1 Methyl Methacrylate/Ethyl Acrylate | Ex. 2 Styrene/Ethyl Acrylate | Ex. 3 Vinyl Acetate |
|---|---|---|---|
| Methyl Methacrylate | 60 | | |
| Ethyl Acrylate | 40 | 20 | |
| Styrene | | 80 | |
| Vinyl Acetate | | | 100 |
| Sodium Persulfate | 0.3 | 0.3 | 0.3 |
| Sodium Bisulfite or Sodium Bicarbonate or mixtures | 0.2 | 0.2 | 0.2 |
| Sodium Tris-[n-heptylsulfonyl]methane | 2 | 2 | 2 |
| Water | 150 | 150 | 150 |

[1] Numerals are parts by weight.

PROCEDURE

Two-thirds of the water is charged to the reaction kettle, agitation is started and sodium tris-[n-heptylsulfonyl]methane and sodium bisulfite or sodium bicarbonate are added. Heating and purging with nitrogen to remove oxygen from the system are started. The persulfate is dissolved in the remaining ⅓ of water (50 parts). One-fifth of the persulfate solution is added to the contents in the kettle. Monomer and the catalyst solution are added slowly when the desired temperature is reached (50–75° C.). The monomer addition may be over a period of 1–2 hours or longer depending on the temperature used. Very slow purging of nitrogen is continued throughout the reaction. The rate of addition of catalyst solution is adjusted to cover the same period so that there will be approximately ⅛ of the persulfate solution remaining. This is added slowly after all the monomer has been added. Upon completion of all additions, nitrogen flow and stirring are maintained for one to five hours longer.

Data obtained on polymer yield and on the properties of the resultant latices and films appear in the following table.

TABLE II

| | Methyl Methacrylate/Ethyl Acrylate (Ex. 1) | Styrene/Ethyl Acrylate (Ex. 2) | Vinyl Acetate (Ex. 3) |
| --- | --- | --- | --- |
| Conversion (Weight percent) | 98.5 | 99+ | 96.5 |
| Coagulum (Weight percent) | 0.3 | 0.0 | 0.0 |
| Emulsion Color | (1) | (1) | (2) |
| Emulsion Solids (percent) (Theory=40%) | 38.5 | 37.6 | 40.0 |
| Emulsion Viscosity at 30° C., Ford Cup number 3, seconds | 19.5 | 19.5 | 60.0 |
| Emulsion Particle Size (A.): | | | |
| Range | 1,400–5,200 | 1,400–4,400 | 1,200–11,200 |
| Peak | 2,800–3,300 | 2,800–3,100 | 2,100–4,750  5,950–7,600 |
| Film, Appearance | (3) | (4) | (5) |

1 Blue-White.
2 White.
3 Blue-White-Opaque.
4 Iridescent purple.
5 Blue-White-Mottled.

From the results appearing in the foregoing table, it is readily apparent that only a trace amount or no coagulum is obtained in different emulsion polymerization systems using a typical substituted trisulfonylmethane salt, i.e., sodium tris-[n-heptylsulfonyl]methane, as an emulsifying agent. Since a low coagulum percentage value is a measure of a stable, creamy, smooth latex, it is evident that the novel emulsifying agents employed in the process of this invetnion are surprisingly effective in various polymerizations systems.

Moreover, the process of this invention wherein a substituted trisulfonylmethane salt is utilized as an emulsifying agent is unexpectedly advantageous for affording high conversion levels, i.e., greater than 95%. By contrast, however, no reaction, and thus no conversion, is observed in these same emulsion polymerization systems when a substituted trisulfonyl methane (e.g., tris-[butylsulfonyl]methane) of the type disclosed in the prior art (cf. Samen, Arkiv. Kemi, Mineral Geol. 15B, No. 15, (1942)) is used.

It has also been found that wax and polymer emulsions produced using substituted trisulfonylmethane salts as emulsifying agents give excellent wetting when spread on metal, glass, rubber, linoleum, asphalt tile, polyvinyl chloride, polyvinylidine chloride and polymethyl methacrylate. Using dip coating procedures it is possible to obtain extremely thin continuous coatings.

EXAMPLES 4–16

Table III below lists other substituted trisulfonylmethane compounds, the alkali metal, amino and ammonium salts of which exhibit substantially the same excellent results described in Examples 1–3 when employed as emulsion polymerization agents in substantially the same manner as described in said examples.

TABLE III

| Example | Substituted trisulfonylmethane |
| --- | --- |
| 4 | Tris[4-cyclohexylbutylsulfonyl]methane. |
| 5 | Tris[6-phenylhexylsulfonyl]methane. |
| 6 | Tris[6,p-tolylhexylsulfonyl]methane. |
| 7 | Tris[6,α-naphthylhexylsulfonyl]methane. |
| 8 | Bis[n-butylsulfonyl]-[4-p-heptylcyclohexylbutylsulfonyl]methane. |
| 9 | Bis[n-butylsulfonyl]-[p-dodecylbenzylsulfonyl]methane. |
| 10 | Bis[p-tolylsulfonyl]-[dodecylsulfonyl]methane. |
| 11 | Bis[cyclohexylsulfonyl]-[octylsulfonyl]methane. |
| 12 | Bis[methylsulfonyl]-[octadecylsulfonyl]methane. |
| 13 | Bis[phenylsulfonyl]-[dodecylsulfonyl]methane. |
| 14 | Bis[n-hexylsulfonyl]-[dodecylsulfonyl]methane. |
| 15 | Bis[methylsulfonyl]-[docosanylsulfonyl]methane. |
| 16 | Tris[n-hexyloxyethylsulfonyl]methane. |

I claim:

1. A polymerization process which comprises polymerizing at least one substantially water-insoluble ethylenically unsaturated organic compound in an aqueous medium in the presence of a free radical polymerization catalyst and as an emulsifier a substituted trisulfonylmethane of the formula:

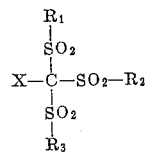

wherein X represents a cation selected from the group consisting of alkali metal, amino and ammonium cations; $R_1$ represents the functional group

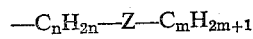

with Z equal to a radical selected from the group consisting of methylene, phenylene, naphthylene, cyclohexylene, and oxy, with the provision that $n+m$ must be a whole integer from 4 to 21 and further provided that when Z is oxy, $n$ is at least 1; $R_2$ and $R_3$ each represent a substituent selected from the group consisting of lower alkyl, phenyl, tolyl, cyclohexyl and $R_1$.

2. A polymerization process which comprises copolymerizing styrene and ethylacrylate in an aqueous medium in the presence of a free radical polymerization catalyst and as an emulsifier the sodium salt of tris[n-heptylsulfonyl]methane.

3. A polymerization process which comprises copolymerizing methylmethacrylate and ethylacrylate in an aqueous medium in the presence of a free radical polymerization catalyst and as an emulsifier the sodium salt of tris[n-heptylsulfonyl]methane.

4. A polymerization process which comprises polymerizing vinyl acetate in an aqueous medium in the presence of a free radical polymerization catalyst and as an emulsifier the sodium salt of tris[n-heptylsulfonyl]methane.

5. The process of claim 1 wherein said substituted trisulfonylmethane is present in an amount of at least 0.05% based on the weight of said organic compound.

References Cited

UNITED STATES PATENTS 3,037,007  5/1962  Scholz _____ 260—89.5

OTHER REFERENCES

Samen: Chem. Abs., 37 (1943), p. 5016.
Bulasubramanian et al.: J. Chem. Soc. (1954), pp. 1844–7.

JOSEPH L. SCHOFER, *Primary Examiner.*

HARRY WONG, JR., *Assistant Examiner.*